J. P. BOND.
BAND BRAKE CLAMP.
APPLICATION FILED JUNE 16, 1919.
1,316,266. Patented Sept. 16, 1919.
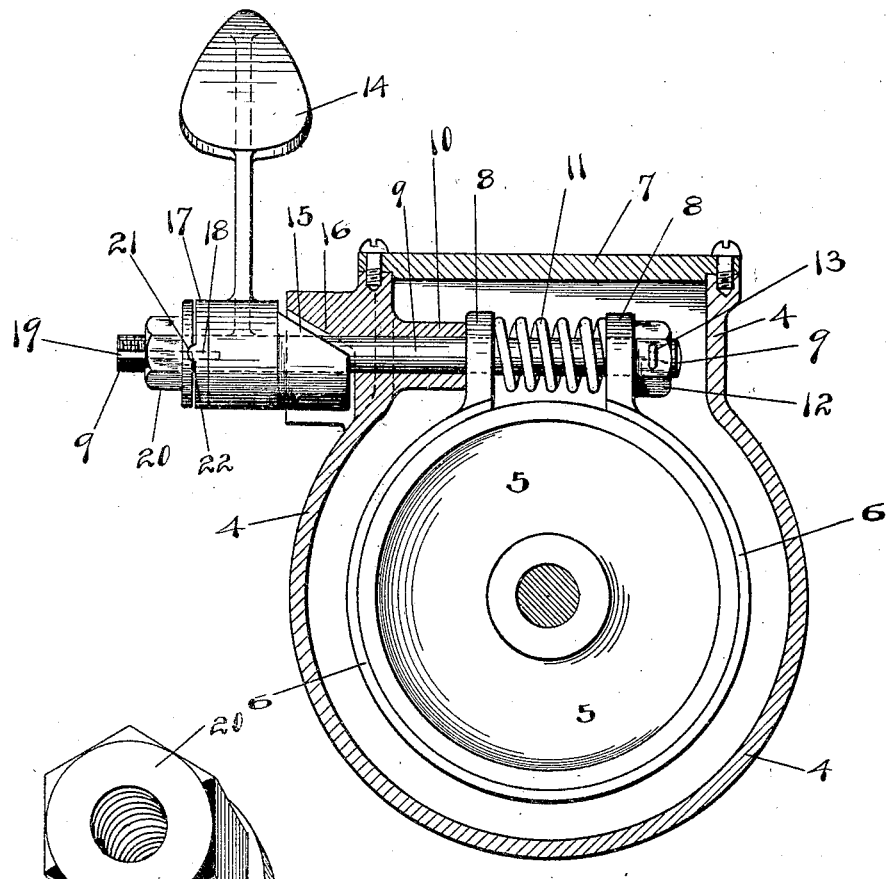
FIG. 1.
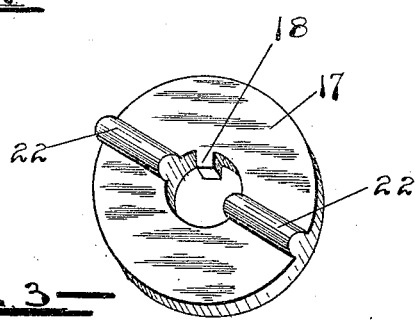
FIG. 2.
FIG. 3.
INVENTOR,
JOHN P. BOND
BY C. F. Blake
ATTY.

UNITED STATES PATENT OFFICE.

JOHN P. BOND, OF PORTLAND, OREGON.

BAND-BRAKE CLAMP.

1,316,266.  Specification of Letters Patent.  Patented Sept. 16, 1919.

Application filed June 16, 1919. Serial No. 304,721.

*To all whom it may concern:*

Be it known that I, JOHN P. BOND, a citizen of the United States, residing at Portland, county of Multnomah, State of Oregon, have invented certain new and useful Improvements in Band-Brake Clamps, of which the following is a specification.

My invention relates to band brake clamps in general, and particularly to such clamps as are used upon automobiles for tightening the brake bands thereon which are disposed within the transmission casing.

Heretofore it has been necessary to remove the transmission casing cover in order to tighten the bands, which is not only inconvenient and time consuming, but also open to the objection that incompetent or careless persons performing the operation frequently allow tools to fall into the casing which then necessitates the removal of the transmission from the automobile to regain the lost tool.

The object of my invention is to obviate these objections to present construction, and to provide simple means for tightening the band without removing the casing cover, and I accomplish this object by means of the construction illustrated in the accompanying drawing, like characters of reference indicating like parts throughout the several views thereof, and in which:

Figure 1 is a transverse sectional elevation of a transmission casing containing a brake band, with my device installed thereon.

Fig. 2 is a perspective view of the adjusting nut.

Fig. 3 is a perspective view of the locking washer.

In that type of automobile to which my invention is especially adapted the transmission casing 4 contains the brake wheel or drum 5 upon the periphery whereof the brake band 6 is mounted, access to the band being through the casing cover 7.

Each end of the band 6 is provided with a lug 8 through which is passed a bolt 9, said bolt passing outside of the casing 4 through a bearing 10 thereon.

Upon the bolt 9 and between the lugs 8 is mounted a spring 11 adapted to keep the lugs 8 separated sufficiently to insure that the band 6 is free of the drum 5, and a nut 12 is screwed upon the end of bolt 9 and secured thereon by a split pin or cotter 13, so that the lugs 8 and spring 11 are prisoners upon bolt 9 between the face of bearing 10 and nut 12.

Upon the end of bolt 9 outside casing 4 is freely mounted a foot pedal 14, upon the hub thereof there being a cam 15 adapted to coact with a cam 16 upon casing 4 so that as the foot pedal is depressed the coaction of said cams will cause outward movement of said foot pedal away from casing 4.

Mounted upon bolt 4 adjacent the hub of foot pedal 14 is a locking washer 17 having thereon an inwardly radially projecting lug 18 adapted to enter a groove 19 in the end of bolt 9, thereby being longitudinally movable but nonrotatively fixed upon said bolt.

An adjusting nut 20 is screwed upon the outer end of bolt 9, said nut having a groove 21 scored across the face thereof adjacent the washer 17, said washer being provided with lugs 22 adapted to enter grooves 21 and thereby lock the nut 20 upon the bolt 9.

To adjust the band 6 nut 20 is tightened or loosened upon bolt 9, as required, the spring 11 deflecting sufficiently to allow the lugs 22 to withdraw from their respective grooves 21 in nut 20 while the latter is being turned, and to reënter the grooves when the nut has been sufficiently adjusted, and thereby prevent further movement of the nut upon the bolt.

When depressed, the outward movement of the foot pedal caused by the coaction of the cams 15 and 16, will cause outward movement of the bolt 9 by means of nut 20, thereby causing the lugs to be pressed together between nut 12 and bearing 10 which tightens band 6 upon drum 5.

I am aware that none of the several mechanical elements of this device are new in the art, but I claim that the particular grouping of these elements is so conductive to convenience and economy of time when adjusting the band as to constitute an advance in the art of patentable novelty.

Having disclosed my invention so that to others it will be clear and understandable, what I claim as new, and desire to secure by Letters Patent is:

A transmission casing; a brake drum therein; a brake band upon said drum; lugs upon the ends of said band; a bolt passing through said lugs and outside of said casing; a spring upon said bolt between said lugs; a foot pedal freely mounted upon said bolt adjacent the casing; coacting cams upon said foot pedal and said casing; a locking washer upon said bolt adjacent said foot pedal; and a nut upon said bolt adjacent said washer, and adapted to be locked in position thereby.

In witness whereof I claim the foregoing as my own, I hereunto affix my signature in the presence of two witnesses, at Portland, county of Multnomah, State of Oregon, this 23rd day of May, 1919.

JOHN P. BOND.

Witnesses:
C. F. BLAKE,
ALBERT J. GROBEN.